(12) United States Patent  
Monahan et al.

(10) Patent No.: US 6,427,329 B2
(45) Date of Patent: Aug. 6, 2002

(54) METHOD OF FORMING A HUB WITH BLIND BORE

(75) Inventors: Randy J. Monahan, Lakewood; Ralph Melari, Sagamore Hills; Anthony J. Rose, Sr., Independence, all of OH (US)

(73) Assignee: A. J. Rose Manufacturing Co., Avon, OH (US)

( * ) Notice: Subject to any disclaimer, the term of this patent is extended or adjusted under 35 U.S.C. 154(b) by 0 days.

(21) Appl. No.: 09/843,483

(22) Filed: Apr. 26, 2001

Related U.S. Application Data

(60) Provisional application No. 60/199,890, filed on Apr. 26, 2000.

(51) Int. Cl.$^7$ .............................................. B21D 53/26
(52) U.S. Cl. ........................ 29/894.362; 29/892; 72/71; 72/331
(58) Field of Search ...................... 29/894.362, 894.36, 29/894.325, 892, 892.11; 72/70, 71, 334

(56) References Cited

U.S. PATENT DOCUMENTS

| | | | |
|---|---|---|---|
| 3,080,644 A | 3/1963 | Previte | 29/159 |
| 3,399,560 A | * 9/1968 | Connolly et al. | 72/334 |
| 3,772,928 A | 11/1973 | Gobeille | 74/230.7 |
| 3,851,366 A | 12/1974 | Jacobs | 29/159 |
| 3,964,326 A | 6/1976 | Mickus | 74/230.05 |
| 3,994,181 A | 11/1976 | Sproul | 74/230.8 |
| 4,781,659 A | 11/1988 | Gebhardt | 474/94 |
| 4,824,422 A | 4/1989 | Jocic | 474/170 |
| 4,951,797 A | 8/1990 | Booth | 192/107 |
| 4,996,859 A | 3/1991 | Rose | 72/86 |
| 5,049,115 A | 9/1991 | Kunkel | 474/166 |
| 5,174,025 A | * 12/1992 | Tasaki et al. | 29/894.362 |
| 5,195,241 A | 3/1993 | Bradfield | 29/892 |
| 5,308,289 A | 5/1994 | Funahashi | 474/94 |
| 5,441,456 A | 8/1995 | Watanabe | 474/94 |
| 5,465,485 A | 11/1995 | Miyake | 29/892.11 |
| 5,591,093 A | 1/1997 | Asai | 474/94 |
| 5,619,879 A | 4/1997 | Friese | 72/82 |
| 5,823,904 A | 10/1998 | Hodjat | 474/170 |
| 5,829,291 A | 11/1998 | Tanaka | 72/71 |
| 5,947,853 A | 9/1999 | Hodjat | 474/166 |
| 5,951,422 A | 9/1999 | Roes | 474/94 |
| 5,987,952 A | 11/1999 | Kutzscher | 72/71 |
| 6,105,410 A | * 8/2000 | Sauberlich et al. | 72/71 |

* cited by examiner

*Primary Examiner*—P. W. Echols
(74) *Attorney, Agent, or Firm*—Pearne & Gordon LLP

(57) ABSTRACT

A method for forming a hub having blind bore is provided. The blind bore hub is formed integrally with a solid circular disc by displacing metal radially inward from the upper surface toward the center of the disc to form a hub, and then punching a bore opening through the center of the hub to provide a blind bore therein. A blind bore hub formed by the foregoing method is also provided.

4 Claims, 2 Drawing Sheets

METHOD OF FORMING A HUB WITH BLIND BORE

This application claims the benefit of U.S. Provisional Patent Application Ser. No. 60/199,890 filed Apr. 26, 2000.

BACKGROUND OF THE INVENTION

This invention relates to pulleys and, more particularly, to pulleys having integral hubs that are formed from sheet metal blanks. There are a variety of techniques employed in the fabrication of pulleys having hubs. One such technique involves spin forming the web and rim from a sheet metal blank, machine forming a hub, and attaching the hub to the web by welding or brazing. While this technique facilitates the formation of a hub having a complete shape, the separate operations involved add significant costs to the pulley.

More recent techniques involve radial displacement of metal from an annular sheet metal disc to integrally form a hub having a blind bore therein. Such a technique is described in U.S. Pat. No. 5,987,952. According to that patent, a sheet metal disc having a center hole therethrough is provided. The disc is placed on a powered headstock mandrel having a vertical center pin which extends through the center hole of the disc. A stepped mandrel having an axial bore therein is telescoped over the headstock pin so that the end face of the mandrel engages an annular portion of the disc immediately surrounding its center hole. A shaping roller is pressed against a face of the spinning annular disc and is moved progressively radially inwardly to displace a portion of the metal in the form of a traveling annular wave while thinning the disc. The annular wave is pressed against the rotating stepped mandrel. The wave which is pressed against the mandrel forms the hub, and the annular inward portion held by the mandrel becomes a blind bore for the hub.

A disadvantage of the above technique is that the tooling and the initial hole size in the metal blank dictate the diameter of hubs produced thereby, thus limiting the process to production of blind bore hubs having a single set of given dimensions; i.e. hub diameter and bore opening diameter. If it is desired to change the size of the hub and/or the diameter of the blind bore opening, it is necessary to blank out the disc initially with the desired blind bore diameter and/or change the mandrel tooling. It is therefore desirable to provide a technique for producing a pulley hub having a blind bore wherein the diameter of the hub can be set by a simpler and less expensive change of tooling, and wherein the diameter of the bore opening of a blind bore can be adjusted without having to provide sheet metal blanks with center openings of varying diameter to accommodate different diameter blind bore openings.

SUMMARY OF THE INVENTION

This invention provides a method of forming a hub having a blind bore integrally with a solid circular disc that can be used to form a pulley. The internal diameter of the hub and the internal diameter of the blind bore opening can be easily varied. According to this invention, a solid circular disc is provided. The disc is placed in a recess in a headstock mandrel and is held at its center by a hub-forming mandrel having an outside diameter corresponding to the inside diameter of the hub to be formed. The disc is spun by the headstock mandrel while a shaping roller engages an edge portion of the disc and is moved progressively radially inwardly toward the center of the disc. The roller is also moved downwardly at a slight angle to move metal in the form of a wave toward the center of the disc. The wave is pressed against the hub-forming mandrel to form the hub.

The shaping roller is removed and a final finishing roller is pressed against the hub to finish forming the hub. The disc containing the integrally formed hub is removed from the headstock mandrel and a center hole is punched to conform to the desired bore opening diameter of the blind bore.

Thus it should be appreciated that a wide variety of hub diameters can be produced by replacement of a single, relatively inexpensive hub-forming mandrel, and that a wide variety of bore opening diameters can be incorporated therein by using punches of varying diameters.

DETAILED DESCRIPTION OF THE INVENTION

As used herein, the term "solid circular disc" means a circular metal disc of solid material having no holes therein or therethrough.

Figure 1:
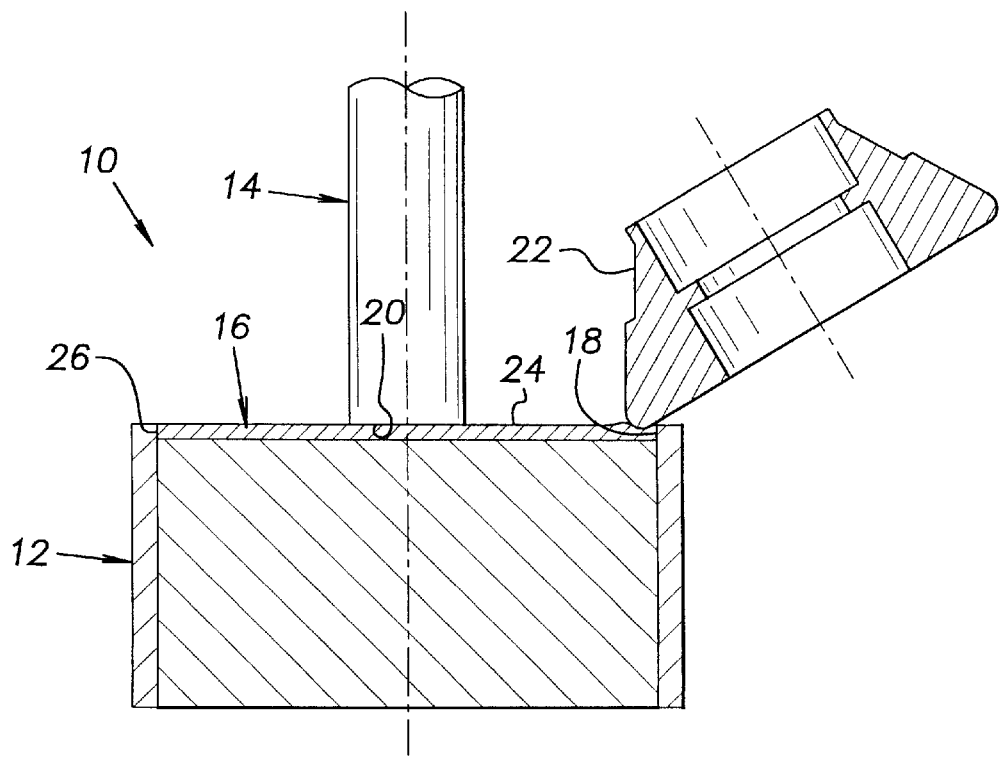
FIG. 1 is a schematic illustration of a hub and blind bore formation operation at an initial stage.
Figure 2:
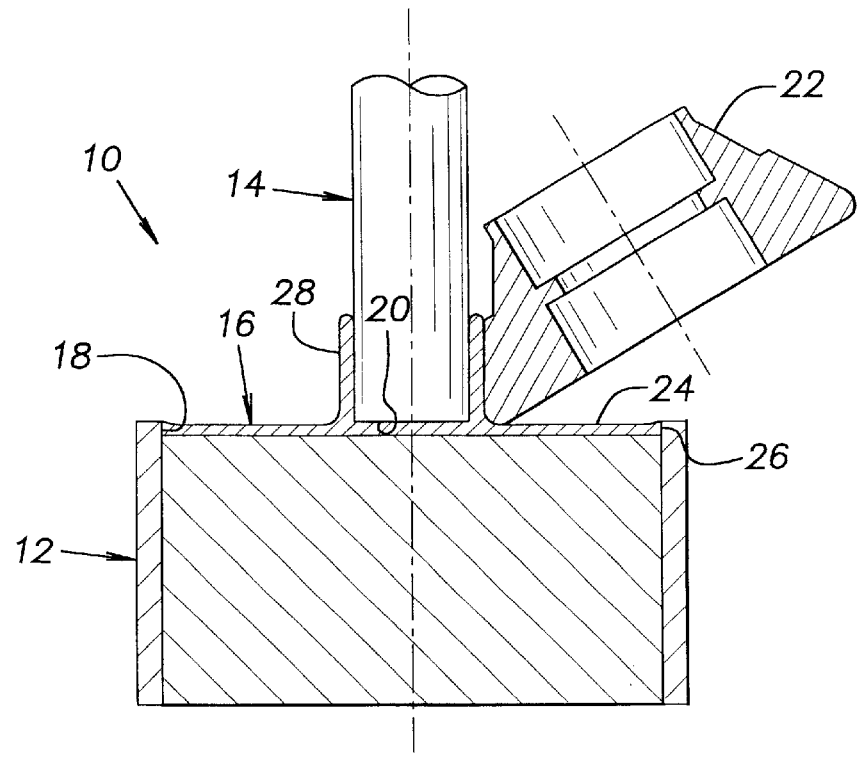
FIG. 2 is a schematic illustration similar to FIG. 1, but showing the operation at a later stage.

Referring now to the drawings, there is illustrated a spin-roll forming machine 10. The machine 10 includes a headstock mandrel 12 and a hub-forming mandrel 14. A solid circular disc 16 of sheet metal is positioned within a circular recess 18 on the headstock mandrel 12 and is securely clamped thereto by an end face 20 of hub-forming mandrel 14. With the mandrel pressed firmly against the center of the disc 16, but being permitted to spin about its longitudinal axis, a shaping roller 22 is brought into contact with an upper face 24 of the disc 16 at a position proximate the edge 26 of disc 16. The headstock mandrel 12 is driven in a circular direction and the shaping roller 22 is moved inward toward the center of the disc 16 while being pressed against upper face 24 at a slight downward angle as is known in the art and as disclosed in U.S. Pat. No. 5,987,952. As the shaping roller 22 moves in this fashion toward the center of the disc 16, metal displaced from face 24 of the disc is forced into contact with the cylindrical sidewall of hub-forming mandrel 14 to form a hub 28, as may be seen in FIG. 2.

Figure 3:
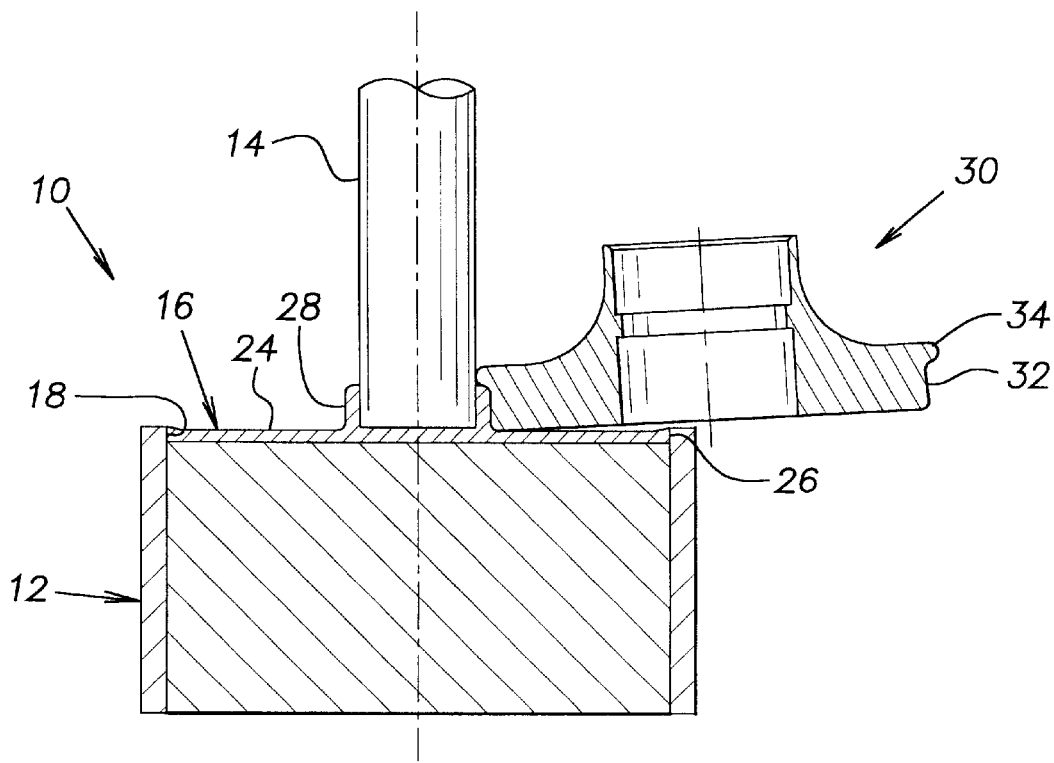
FIG. 3 is a schematic illustration similar to FIG. 2, but showing the operation at a still later stage.

Next, referring to FIG. 3, the shaping roller 22 is removed and a hub finishing roller 30 is positioned so that a tapered surface 32 thereof is pressed against the hub 28 such that the surface 32 is substantially parallel to the hub-forming mandrel 14. An annular ridge 34 of the finishing roller 30 shapes the terminal edge of the hub 28.

Figure 4:
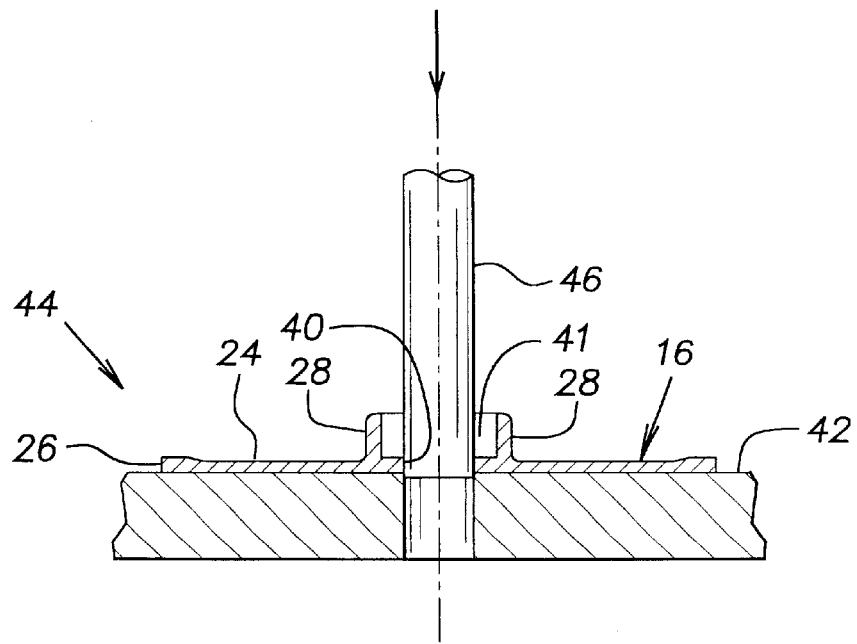
FIG. 4 is a schematic illustration showing the final stage of operation.

Referring now to FIG. 4, a blind bore opening 40 is formed in the hub 28 by removing the disc 16 with integrally formed hub 28 from the headstock mandrel 12, placing it on the bed 42 of a stamping press 44, and driving a punch 46 through the center of the hub 28. The diameter of punch 46 is smaller than internal diameter of hub 28, and is selected to form a bore opening 40 of a blind bore 41 having a desired diameter.

Alternatively, the headstock mandrel can have a hole or opening at its center to accommodate a punch. In this embodiment, solid circular disc 16 is placed on the headstock mandrel 12 and spun as before, and the hub 28 formed as above described. After the hub-forming operation has been completed, hub-forming mandrel 14 is replaced with a punch 46 having a smaller diameter than mandrel 14. Punch 46 is then driven through the center of the hub 28 into the center hole or opening of headstock mandrel 12 to form the blind bore opening 40 of blind bore 41. Optionally, the hub-forming mandrel 14 can have a through bore at its center with an opening at the base adjacent to the circular disc 16. The through bore is adapted to slidably receive a punch therein. Once the hub has been formed as described above, the punch in the through bore of the mandrel 14 is driven through the circular disc 16 at the center of the hub 28 via known means.

It will be understood by one skilled in the art that hubs having a range of internal diameters can be provided according to the method of the invention by selecting a hub-forming mandrel having a diameter corresponding to a desired diameter of a hub to be formed. Likewise, blind bore openings having a range of diameters can be provided by selecting a punch having a diameter corresponding to that of a desired bore opening. Therefore, a blind bore hub according to the invention can be provided having an extremely wide variety of hubs having various internal and bore opening diameters. A spin-roll forming machine adapted to make a hub according to the present invention has significantly greater utility than prior forming machines, because such prior machines were capable of producing only a single size hub, having a single size blind bore opening.

Once the hub 28 has been formed, the disc 16 incorporating said hub can be further worked, machined, shaped, or combined with other elements as well known in the art to form a pulley that incorporates or comprises the hub 28 with a blind bore according to the invention.

While the invention has been shown and described with respect to particular embodiments thereof, those embodiments are for the purpose of illustration rather than a limitation and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A method of forming a hub having a blind bore therein comprising the steps of:
    a) providing a solid circular disc having an upper face;
    b) forcing metal from said upper face radially inwardly toward the center of said disc to form a hub; and
    c) punching a bore opening at the center of said hub, said bore opening having a smaller diameter than the inside diameter of said hub to form a blind bore therein.

2. A method according to claim 1, wherein said hub is spin-roll formed from metal displaced radially inward from said upper surface of said disc.

3. A method of forming a hub having a blind bore comprising the steps of:
    a) providing a solid circular disc having an upper surface thereof;
    b) placing said disc in a recess in a headstock mandrel and holding said disc at its center by a hub-forming mandrel, said hub-forming mandrel having an outside diameter corresponding to a desired inside diameter of a hub to be formed;
    c) spinning said disc;
    d) engaging said disc with a shaping roller at a downward angle and moving said shaping roller progressively radially inward from a position proximate the edge of said disc along said upper surface thereof, thereby displacing metal from said surface as a traveling annular wave toward the center of said disc;
    e) pressing said annular wave against said hub-forming mandrel to form a hub; and
    f) punching a bore opening at the center of said hub, said bore opening having a smaller diameter than the inside diameter of said hub to form a blind bore therein.

4. A method according to claim 3 further comprising the step of pressing a finishing roller against said hub, said finishing roller having an annular ridge adapted to shape a terminal edge of said hub.

\* \* \* \* \*